3,278,572
IMPROVEMENT IN PRODUCING ZINC GLUTAMATE

John A. Frump, Terre Haute, Ind., assignor to Commercial Solvents Corporation, a corporation of Maryland
No Drawing. Filed Sept. 5, 1963, Ser. No. 306,717
13 Claims. (Cl. 260—429.9)

The present invention is a continuation-in-part application of application Serial Number 128,364, filed August 1, 1961, now abandoned, and entitled Recovery of Glutamic Acid From Whole Beer.

The present invention relates to the production of zinc glutamate, especially for the recovery of glutamic acid or sodium glutamate; and more particularly the present invention relates to the recovery of glutamic acid produced by the fermentation of glutamic acid-producing organisms.

The recovery of glutamic acid from fermentations utilizing certain glutamic acid-producing organisms including E. coli, Aerobacter aerogenes, B. subtilus, Cophalosporium acremonius, Micrococcus varius, Micrococcus glutamicus, Brevibacterium divaricatum, etc., has given rise to numerous problems.

In application Serial No. 96,713, filed March 20, 1961, now abandoned, a method is disclosed for the recovery of glutamic acid. Very generally, this application discloses the recovery of glutamic acid by using a zinc salt. A water-soluble zinc salt is added to a filtered glutamic acid fermentation medium and the pH then adjusted to precipitate zinc glutamate. The zinc glutamate is then removed from the filtrate. Sodium hydroxide is added to the zinc glutamate until solid zinc hydroxide is formed and disodium glutamate is left in the solution. The zinc hydroxide precipitate is removed and the filtrate containing disodium glutamate is treated so as to recover either pure glutamic acid or pure monosodium glutamate monohydrate.

The process of this prior application starts with a filtered glutamic acid fermentation medium. If the fermentation medium is not first filtered, the cells of the glutamic acid-producing organisms, among other things, interfere with the recovery operations. Great expense is incurred and significant amounts of glutamic acid are lost in this filtration step.

It has now been surprisingly discovered that zinc glutamate, and subsequently glutamic acid, can be recovered from glutamic acid fermentation media without first filtering the fermentation medium. Thus, great savings are made by eliminating a costly step in the recovery operation; and secondly, a greater percentage of the glutamic acid can be recovered since usually about 15% of the glutamic acid produced in the fermentation was previously lost in the initial filtration of the whole fermentation medium. Another advantage is derived from the fact that no filter aid need be used. The present invention very generally follows the process described in application Serial No. 96,713.

In carrying out the new process of the present invention, one can start with the fermentation medium, advantageously the whole fermentation medium, containing glutamic acid produced by a glutamic acid producing microorganism. A zinc salt or any other suitable zinc ion-yielding compound is added to the unfiltered whole fermentation medium and the conditions are controlled to form a zinc glutamate precipitate in which the particles of zinc glutamate are of a size large enough to permit separation of the zinc glutamate particles from the medium, including other insoluble materials, by filtration and also of a weight sufficient to permit separation of the zinc glutamate particles by centrifuging, if preferred. The glutamic acid can then be recovered from the zinc glutamate as described in application Serial No. 96,713 or alternatively, other known processes can be substituted to further recover glutamic acid or sodium glutamate from zinc glutamate.

In order to form zinc glutamate particles of a size and weight large enough to permit separation thereof from the fermentation medium including other insoluble materials, the zinc salt is added to the whole fermentation medium and the agitation is controlled in such a manner as to avoid shearing of the zinc glutamate particles produced. In adjusting the pH to precipitate zinc glutamate, the pH adjustment is made rapidly to prevent the formation of fines. A residence time sufficient to permit the zinc glutamate particles to grow to their proper size is employed.

More specifically, a water-soluble zinc salt can be added to the fermentation medium in the form of zinc chloride, zinc sulfate, zinc nitrate, etc., in amounts sufficient to precipitate essentially all of the glutamic acid in the fermentation medium as zinc glutamate. It is preferred to add the zinc salt in molar ratios from at least about 1:1 to 1.5:1, preferably about 1.1:1, mole of zinc salt per mole of glutamic acid present in the fermentation medium. During the addition of the soluble zinc salt and during the pH adjustment, the mixture is agitated in such a manner as not to cause any shearing or breaking up of the zinc glutamate particles being formed. This agitation can be accomplished by low speed stirring.

When adjusting the pH of the fermentation medium containing the water-soluble zinc salt in order to precipitate zinc glutamate, it is preferred to adjust the pH rapidly since it has been found that when the adjustment is made rapidly it prevents the formation of fines. The pH is generally adjusted to a range of from about 5.0 to 9.5 and advantageously about 5.9 to about 6.5 or 7.5, e.g. a pH of 6.3, with an alkaline compound or basic substance. The optimum pH is about $6.8 \pm 0.2$. Although sodium hydroxide is preferably used to adjust the pH of the fermentation medium containing the zinc salt, other alkaline compounds, e.g., ammonium hydroxide, calcium oxide, calcium hydroxide, potassium hydroxide, and the like can also be used.

It has been found that if agitation of the fermentation medium containing the zinc salt is continued for a residence time of at least about 15 minutes, zinc glutamate of larger particle sizes is produced. Although this is not essential to the present process, it is a preferred manner of practicing the process of the present invention.

The precipitate of zinc glutamate formed has a sandy texture, is of a greater density, e.g. heavier, than other insolubles in the fermentation medium, and is composed of particles generally having a profile of about .007 to .0024 square inch. It is the heaviness and/or size of the zinc glutamate particles which allows the zinc glutamate particles to be separated from the fermentation medium including insolubles other than zinc glutamate. The separation can be effected using liquid-solid separation means such as filtration and by centrifugation. Since the zinc glutamate particles are heavier than the other insolubles in the fermentation medium, centrifuging is preferred. The choice of the type of separation is not a limiting factor in my invention. Also, when filtering, any filter may be used as long as it supports the particles of zinc glutamate and allows the rest of the materials of the fermentation medium to pass. In most filtrations, the filtration medium does not do the actual filtering but merely acts as a support for the cake of solids that is deposited and on which the separating process takes place. The filter medium should be selected primarily for its ability to retain the solids without plugging and without undue bleeding of the particles to be retained at the start of filtration.

The precipitated zinc glutamate retained by the filter or separated by centrifuging essentially does not contain any foreign matter. It is washed with small amounts of water. The zinc glutamate prepared in accordance with the present invention may be used to recover either glutamic acid or sodium glutamate as more fully discussed below.

To recover the glutamic acid or sodium glutamate, the zinc glutamate is first put in a more easily manipulatable condition by slurrying it with a small amount of water. The amount of water used is not critical. Too little water will make a slurry which is hard to handle mechanically and too much water will result, when recycling, in excess dilution of the final solution that can be recycled. An aqueous solution of an alkaline or basic substance, preferably sodium hydroxide when the ultimate product desired is sodium glutamate, which will form a soluble glutamate is then added to the slurry until substantially all the zinc glutamate is converted to soluble disodium glutamate and insoluble zinc hydroxide. The addition of sodium hydroxide is advantageously stopped before the zinc hydroxide begins to dissolve. This is satisfactorily accomplished by adding sodium hydroxide until a pH range of about 12.0 to about 12.5 is reached. For instance, when about 2 moles NaOH have been added for each mole of zinc glutamate. It is preferred to add an aqueous solution of 50% sodium hydroxide until a pH of about 12.3 is reached.

When the proper pH is reached, the mixture of disodium glutamate and zinc hydroxide is stirred for about an hour and then filtered and washed with small amounts of water. The residue, containing zinc hydroxide, can later be converted to a water-soluble zinc salt, e.g. zinc chloride, such as that used to form the zinc glutamate by the addition of a mineral acid, e.g. hydrochloric acid, and recycled in the process. The specific mineral acid employed is not important as long as it forms a soluble zinc salt. Not only does this recycle provide a saving in that generally at least about 85% of the zinc utilized in the formation of zinc glutamate may be recovered and recycled, but also any glutamic acid entrapped in the zinc hydroxide is also recycled to increase the percentage yield of glutamic acid.

The pH of the glutamic acid-containing filtrate remaining after separation of the zinc hydroxide can then be adjusted to about 3.2. The specific acid used to adjust the pH is not important as long as the proper pH can be reached and interfering side products are not formed. Acids such as sulfuric, hydrochloric, nitric, and the like can be used with good results. After adjusting the pH, the solution is stirred for about one hour while a glutamic acid precipitate forms. The glutamic acid crystals are then removed and washed with small portions of water. Glutamic acid substantially 100% pure can be recovered.

Alternatively, another mode of recovery can be effected by adjusting the pH of the glutamic acid-containing filtrate to about 7, instead of about 3.2, and adding a monosodium glutamate (MSG) "insolubilizing agent" for instance, an alcohol such as methanol, ethanol, isopropyl alcohol, etc., and stirring the solution to precipitate monosodium glutamate.

An MSG "insolubilizing agent" is any liquid, water-miscible compound in which MSG is less soluble than it (MSG) is in water and which agent will decrease the solubility of MSG in solution to supersaturate or aid in supersaturating the solution and thus crystallize or enhance the crystallization of MSG. Generally, the insolubilizing agent can be incorporated into the solution in amounts up to about 80 volume percent, for instance amounts from about 0.001 or 10 to about 50 volume percent. Suitable insolubilizing agents include aliphatic oxygen compounds, for instance lower alkanols containing from 1 to 3 carbon atoms such as methanol, ethanol, propanol and isopropanol; lower alkyl carbonyl compounds such as acetone and methyl ethyl ketone; and their mixtures. The insolubilizing agent can advantageously be added to the MSG solution, preferably heated for instance to about 50° C. or 60° C., in increments by initially adding half of the total amount of the insolubilizing agent to be added and thereafter slowly adding the remainder of the insolubilizing agent while maintaining the temperature of, and agitating (e.g. stirring), the solution to avoid the formation of undesirable materials. The monosodium glutamate can be recovered by filtration or any other convenient means. The monosodium glutamate thus recovered is substantially 100% pure.

In practicing the process of the instant invention, the filtrate from which the glumatic acid was precipitated can also be recycled in the next recovery batch. Moreover substantially 100% pure glutamic acid can be recovered in better than 90% yields.

It is understood that the examples given below are for the purposes of illustration only and that the specific ingredients or amounts thereof or the specific procedures set out therein do not limit the present invention. It is intended to include all equivalents obvious to those skilled in the art.

EXAMPLE I

To a 1,800-milliliter portion of nutrient fermentation medium in which glumatic acid has been produced to the extent of 44.5 grams per liter was added 212 grams of a 42.1% by weight aqueous zinc chloride solution. The pH of the above was adjusted to 6.3 with an aqueous solution of ammonium hydroxide. This mixture was agitated for 15 minutes by stirring at speeds low enough not to break up the zinc glutamate particles being formed. The stirred mixture was then filtered and washed with a small amount of water. The filtered material was composed of pure zinc glutamate particles which were sandy in texture and did not contain any glutamic acid-producing organisms. All the glutamic acid was recovered from the mixture of zinc glutamate except for some glutamic acid in the filtrate. The filtrate contained less than 4.0 grams of glutamic acid per liter. A small amount of water was then added to the filtered zinc glutamate to form a slurry, and to this slurry was added an aqueous solution of sodium hydroxide until a pH of 12.3 was reached. Upon reaching the desired pH, the mixture was stirred for one hour and then filtered. The filtrate was then adjusted to pH 3.2 by the addition of hydrochloric acid and again stirred for one hour. During the stirring, glutamic acid precipitated and was then filtered to give a 94% recovery of the original amount of glutamic acid contained in the nutrient fermentation medium.

EXAMPLE II

The procedure of Example I is followed, substituting sodium hydroxide for ammonium hydroxide. Relatively pure glutamic acid is recovered.

EXAMPLE III

To illustrate the recovery of monosodium glutamate, the procedure of Example I is followed. However, following the separation of the filtrate, after addition of sodium hydroxide, the pH of the filtrate is adjusted to 6.9, instead of 3.2, by the addition of hydrochloric acid. The solution is stirred and methanol slowly added to it. Monosodium glutamate precipitates, is filtered from the mixture, is washed with small portions of methanol and is recovered.

EXAMPLE IV

The procedure of Example I is followed except that the glutamic acid-containing mixture is placed in a centrifuge and the glutamic acid separated by centrifuging, instead of by filtration.

EXAMPLE V

In order to calculate the size distribution of the zinc glutamate particles that allow an effective separation of zinc glutamate from the fermentation medium and glutamic producing organisms, zinc glutamate was prepared by the process of Example I and the following particle size distribution was noted. Of a 258.7-gram portion of zinc glutamate particles:

.19 gms. or 0.07% were retained on a sieve of .0165 sq. in. openings;

1.82 gms. or 0.7% were retained on a sieve of .0138 sq. in. openings;

25.29 gms. or 9.8% were retained on a sieve of .0070 sq. in. openings;

58.15 gms. or 22.4% were retained on a sieve of .0049 sq. in. openings;

68.06 gms. or 26.3% were retained on a sieve of .0041 sq. in. openings;

68.24 gms. or 26.4% were retained on a sieve of .0029 sq. in. openings;

19.95 gms. or 7.7% were retained on a sieve of .0024 sq. in. openings;

16.98 gms. or 6.6% were passed through a sieve of .0024 sq. in. openings.

That which is claimed is:

1. In a process for the recovery of glutamic acid produced by the fermentation of glutamic acid-producing organisms in a fermentation medium comprising adding a water-soluble zinc salt to said medium, rapidly adjusting the pH of the resulting mixture to from about 5.0 to about 9.5 with an alkaline compound to precipitate zinc glutamate, separating said zinc glutamate, and recovering glutamic acid therefrom; the improvement of producing zinc glutamate particles of such a size as to permit separation from the whole fermentation medium containing glutamic acid and glutamic acid-producing organisms comprising adding the zinc salt to the whole fermentation medium, slowly agitating the whole fermentation medium upon addition of the alkaline compound for a time sufficient to produce zinc glutamate particles having a profile in excess of about 0.0024 square inch, and thereafter directly separating from the whole fermentation medium a residue of essentially the zinc glutamate particles.

2. The process of claim 1 wherein the water-soluble zinc salt is selected from the group consisting of zinc chloride, zinc sulphate and zinc nitrate.

3. The process of claim 2 wherein the alkaline compound is selected from the group consisting of sodium hydroxide and ammonium hydroxide.

4. The process of claim 1 further including recovery of monosodium glutamate from said zinc glutamate particles, said recovery comprising forming an aqueous slurry of the separated zinc glutamate, adding an aqueous solution of sodium hydroxide to the slurry to convert the zinc glutamate into soluble disodium glutamate and insoluble zinc hydroxide, stopping the addition of the sodium hydroxide before the zinc hydroxide begins to dissolve, separating the zinc hydroxide from the solution of disodium glutamate, acidifying the disodium glutamate solution to a pH of about 7, adding a monosodium glutamate insolubilizing agent in an amount sufficient to precipitate monosodium glutamate, and recovering the precipitated monosodium glutamate.

5. The process of claim 2 wherein the zinc salt is added to the fermentation medium in a molar ratio of from about 1.0 to 1.5 moles of zinc salt to 1 mole of glutamic acid.

6. The process of claim 1 wherein the residue is separated by filtration.

7. The process of claim 1 wherein the residue is separated by centrifuging.

8. The process of claim 1 wherein the mixture is agitated for at least about 15 minutes.

9. The process of claim 1 wherein the pH of the mixture is adjusted to from about 5.9 to 7.5.

10. The process of claim 1 further including recovery of glutamic acid from said zinc glutamate particles, said recovery comprising forming a slurry of the separated zinc glutamate particles in water, adding to said slurry an aqueous solution of sodium hydroxide to convert the zinc glutamate into soluble disodium glutamate and insoluble zinc hydroxide, the addition of said sodium hydroxide being stopped before the zinc hydroxide begins to dissolve, separating the mixture of zinc hydroxide and disodium glutamate, adding a mineral acid to the separation residue or zinc hydroxide to form a water-soluble zinc salt and recycling the soluble zinc salt so formed to a fermentation medium containing glutamic acid and from which glutamic acid is to be recovered, to form zinc glutamate as a means of recovering glutamic acid from the fermentation medium.

11. The process of claim 4 wherein the monosodium glutamate insolubilizing agent is an aliphatic oxygen compound having from 1 to 3 carbon atoms.

12. The process of claim 4 wherein the monosodium glutamate insolubilizing agent is a lower alkanol.

13. The process of claim 4 wherein the monosodium glutamate insolubilizing agent is a methanol.

References Cited by the Examiner

UNITED STATES PATENTS

| | | | |
|---|---|---|---|
| 2,849,468 | 10/1958 | Cardinal | 260—429.9 |
| 2,929,681 | 5/1960 | Cardinal | 260—429.9 |
| 2,929,839 | 3/1960 | Holgan | 260—527 |

TOBIAS E. LEVOW, *Primary Examiner.*

SAMUEL H. BLECH, *Examiner.*

E. C. BARTLETT, H. M. S. SNEED,
*Assistant Examiners.*